Dec. 15, 1931.  M. MADSEN  1,836,261
PORTABLE ASPHALT MIXING PLANT
Filed April 30, 1928    6 Sheets-Sheet 4
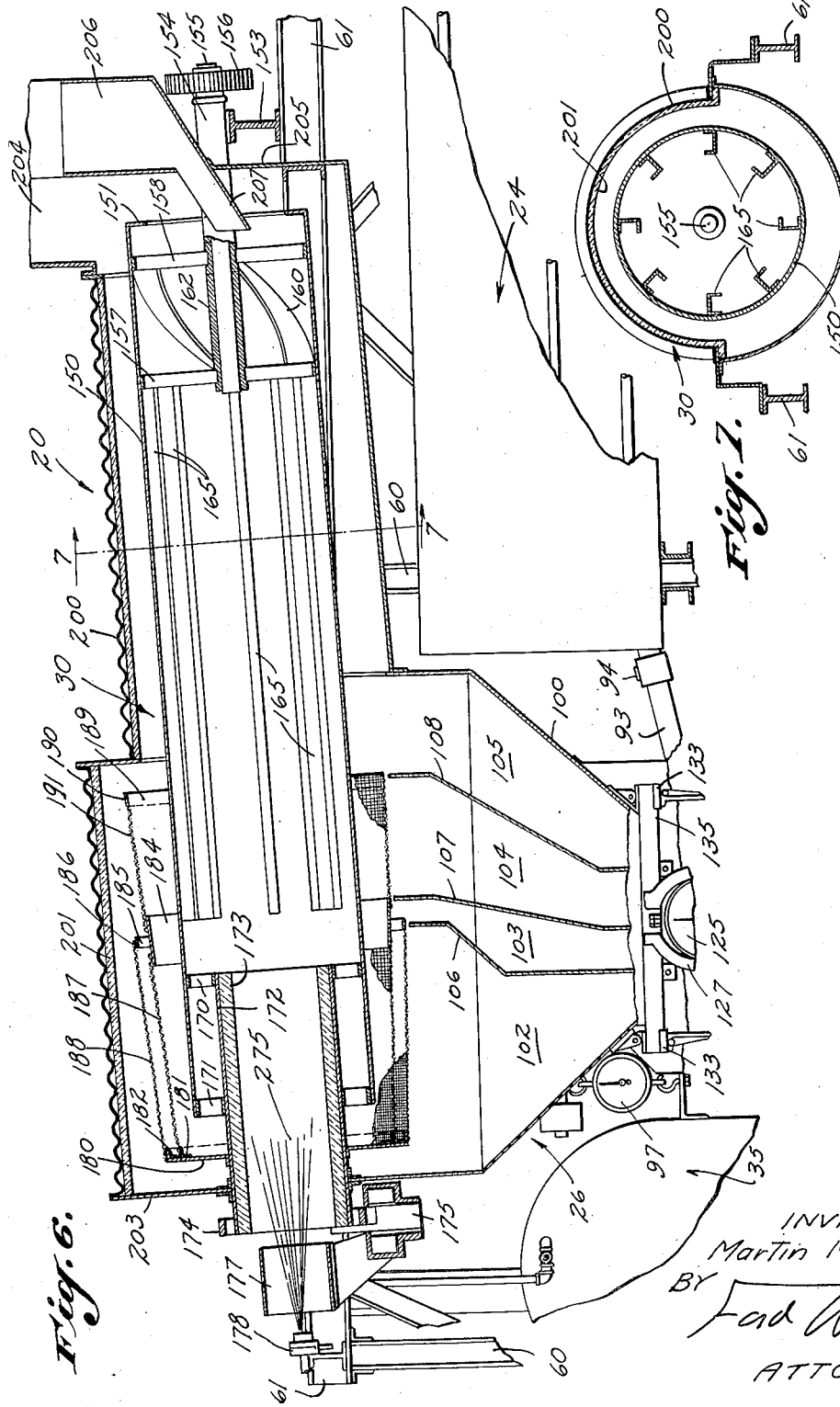

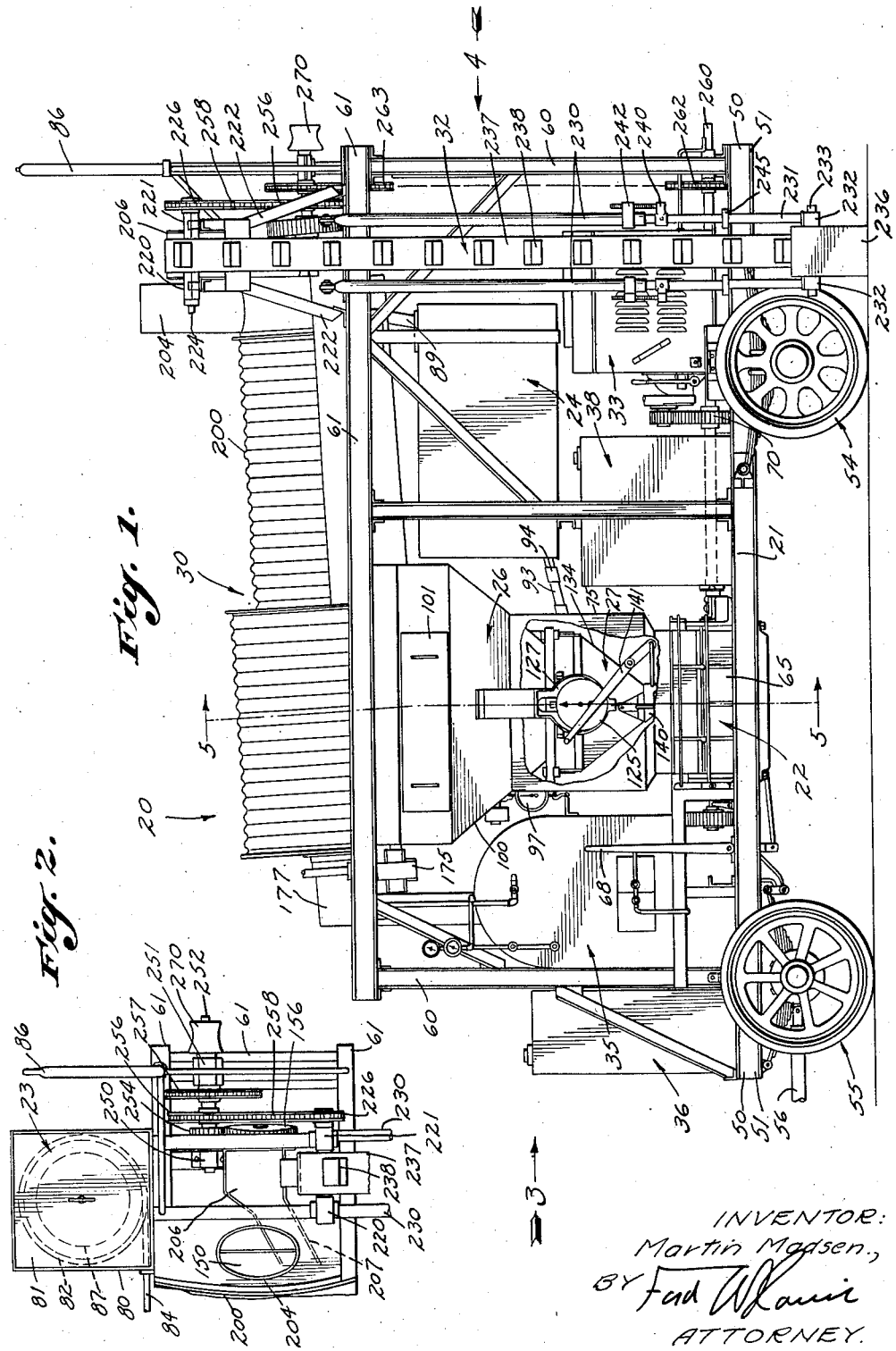

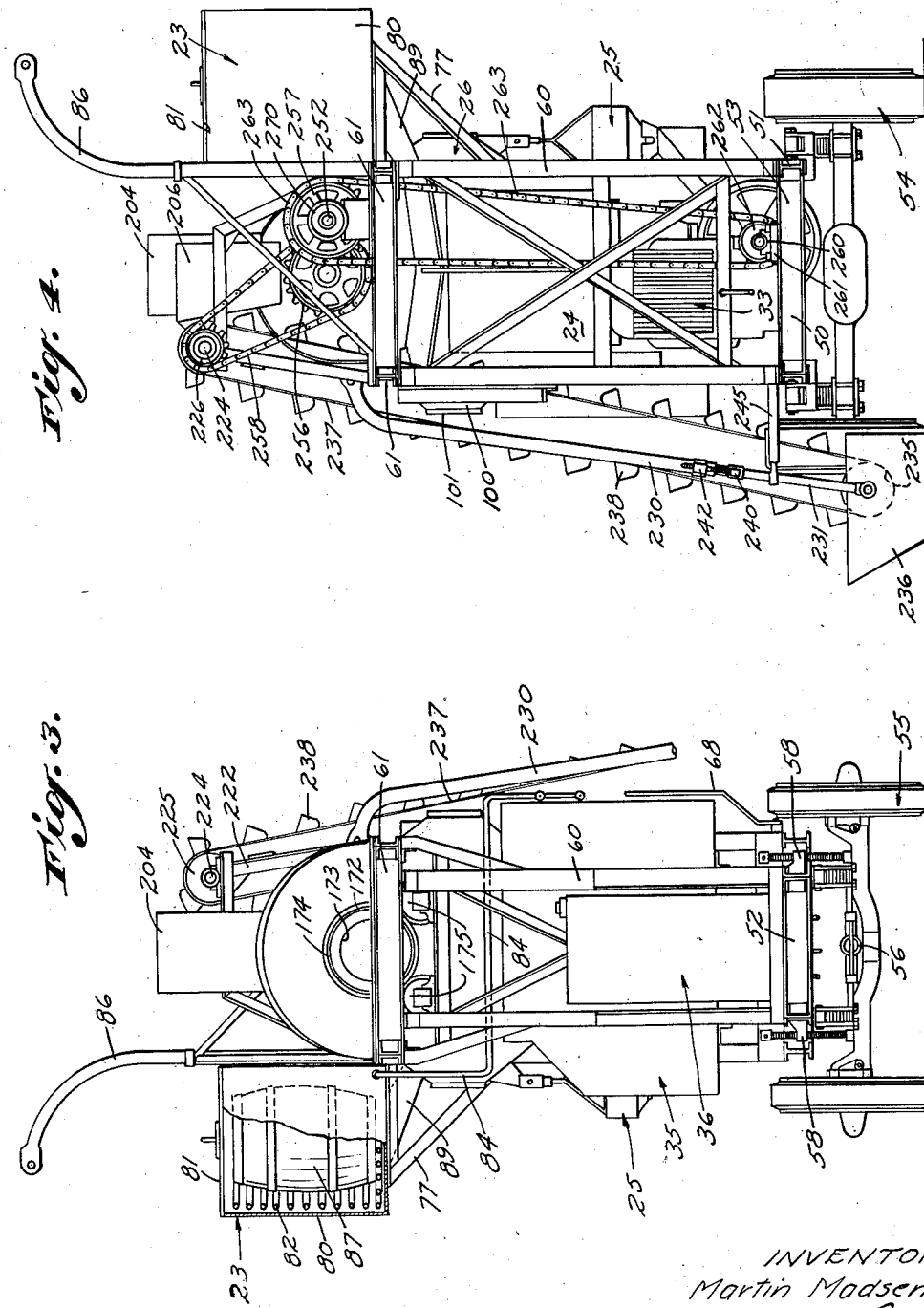

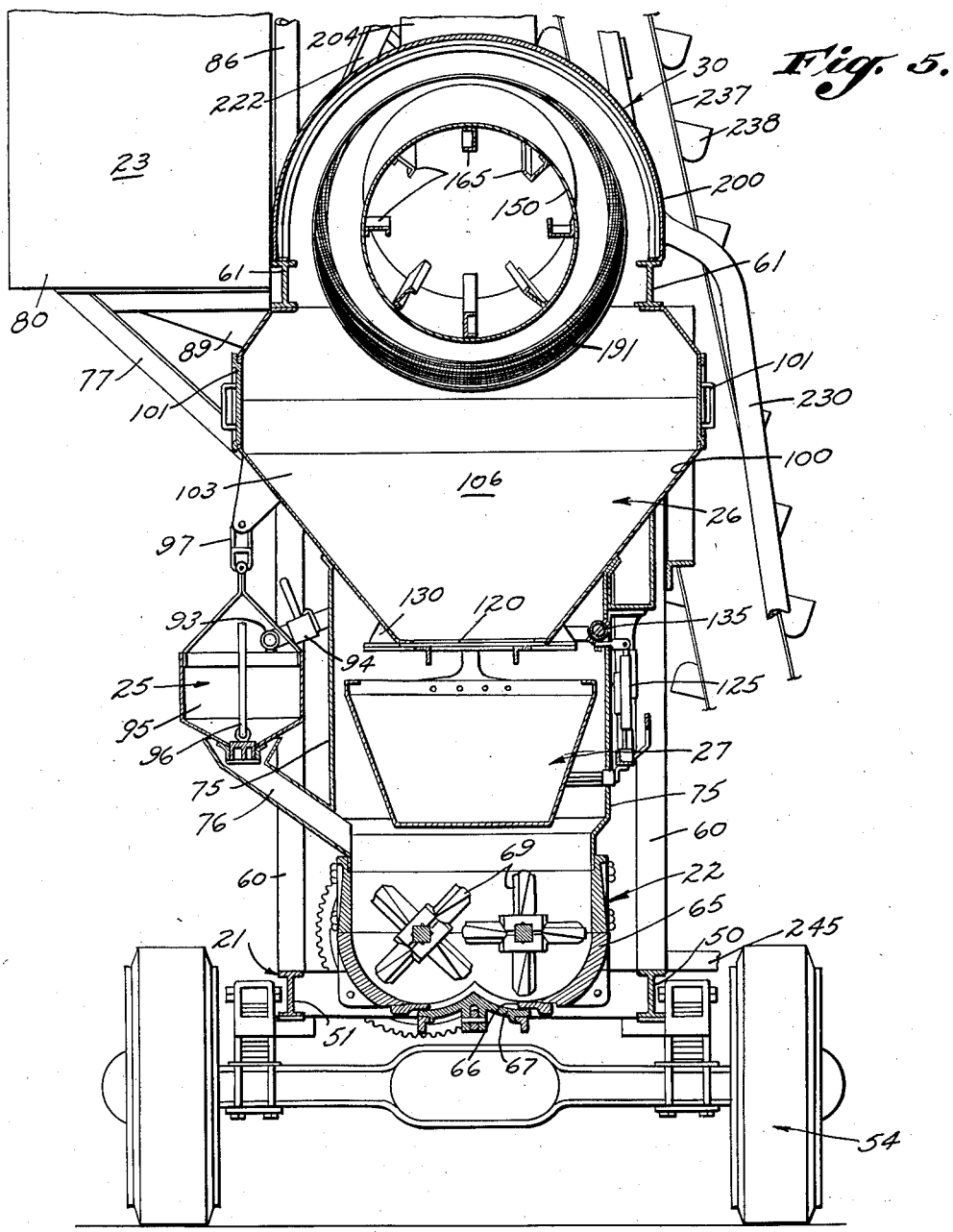

INVENTOR:
Martin Madsen,
BY
ATTORNEY.

Patented Dec. 15, 1931

1,836,261

UNITED STATES PATENT OFFICE

MARTIN MADSEN, OF MONTEREY PARK, CALIFORNIA, ASSIGNOR TO MADSEN IRON WORKS, OF HUNTINGTON PARK, CALIFORNIA, A CORPORATION OF CALIFORNIA

PORTABLE ASPHALT MIXING PLANT

Application filed April 30, 1928. Serial No. 273,876.

My invention relates to paving equipment and more particularly to equipment for mixing asphalt paving material.

Asphalt paving material must be applied hot and it is present practice to transport the hot material in dump trucks from a central stationary mixing plant to the various points where the material is being used in the laying of pavement. In cold weather, or where unavoidable delays are encountered in the transportation of the material, it cools and sticks to the walls of the truck. The need for cleaning asphalt from the trucks is thus a constant source of trouble and expense.

It is therefore an object of my invention to provide a portable asphalt mixing plant which will eliminate the need of transporting hot asphalt paving material over long distances.

It is a further object of my invention to provide a portable asphalt mixing plant which may be operated by a very small crew, thus reducing the labor expense in producing asphalt pavement.

In the asphalt mixing plants in general use, the rock aggregate is dried and heated, and then elevated into hoppers from which it is fed into a mixer where it is mixed with melted asphalt to produce asphalt paving material. I have found that the quality of the product is reduced considerably owing to the heat losses from the aggregate while it is being elevated on a "hot" elevator into the service hoppers.

It is correspondingly an object of my invention to provide an asphalt mixing plant in which heat losses from the aggregate are as far as possible eliminated.

Another object of my invention is to provide a portable asphalt mixing plant in which but a single aggregate elevator is used.

Yet another object is to provide a portable asphalt mixing plant having a simple and economically operated means for removing asphalt from barrels, melting it, and storing it so that it may be conveniently dispensed into the mixer.

A yet further object of my invention is to provide a portable asphalt mixing plant having a novel combination drier and screening mechanism.

Further objects and advantages will be made manifest in the following description taken in connection with the accompanying drawings in which a preferred embodiment of my invention is illustrated:

Fig. 1 is a side elevational view of the portable asphalt mixing plant embodying the features of my invention.

Fig. 2 is a fragmentary plan view of Fig. 1.

Fig. 3 is an end elevational view taken in the direction of the arrow 3 in Fig. 1.

Fig. 4 is an elevational view taken in the direction of the arrow 4 in Fig. 1.

Fig. 5 is a fragmentary enlarged cross-sectional view taken on the line 5—5 of Fig. 1.

Fig. 6 is a fragmentary enlarged longitudinal sectional view illustrating the drying and screen mechanism of my invention.

Fig. 7 is a cross-sectional view taken on the line 7—7 of Fig. 6.

Figure 9:
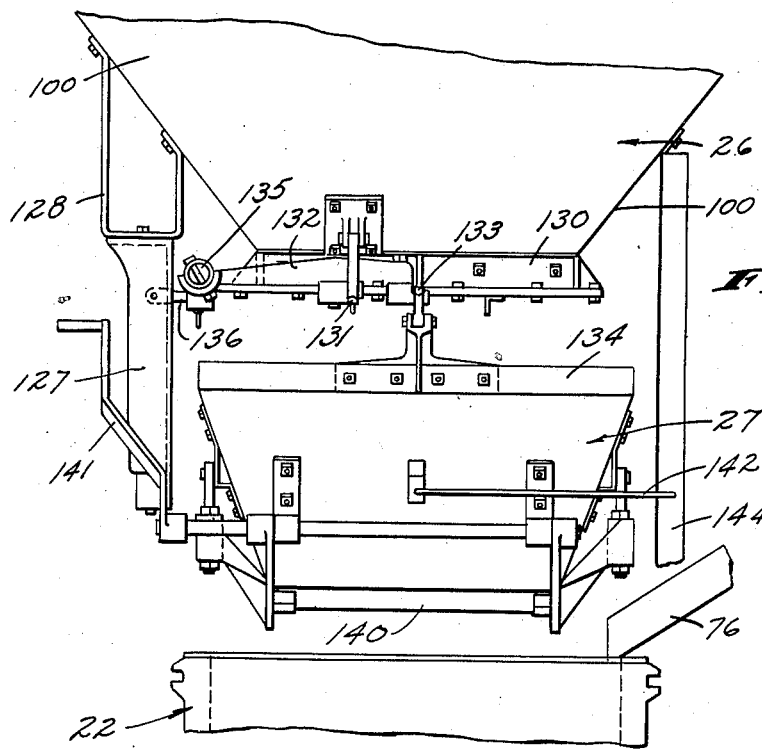
Fig. 9 is an end elevational view of the mechanism shown in Fig. 8.
Figure 8:
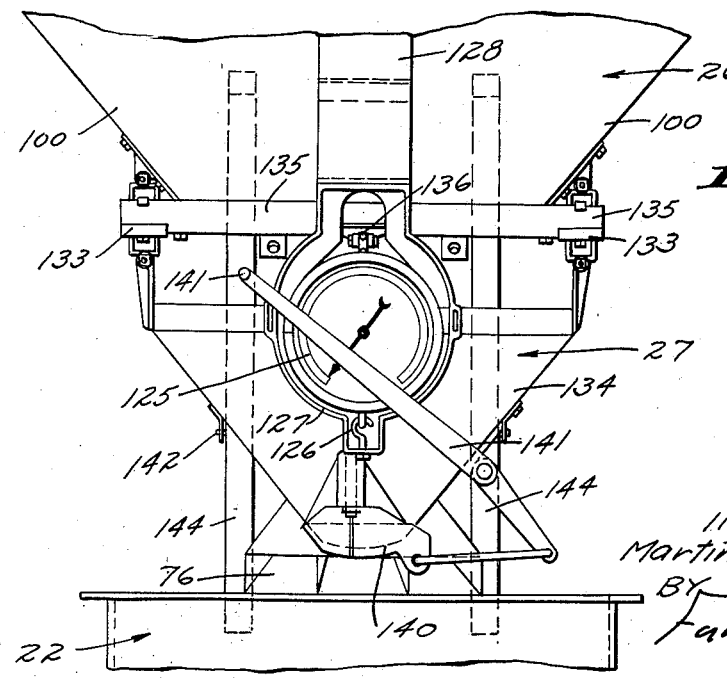
Fig. 8 is a fragmentary side elevational view illustrating the aggregate mechanism of my invention.
Figure 12:
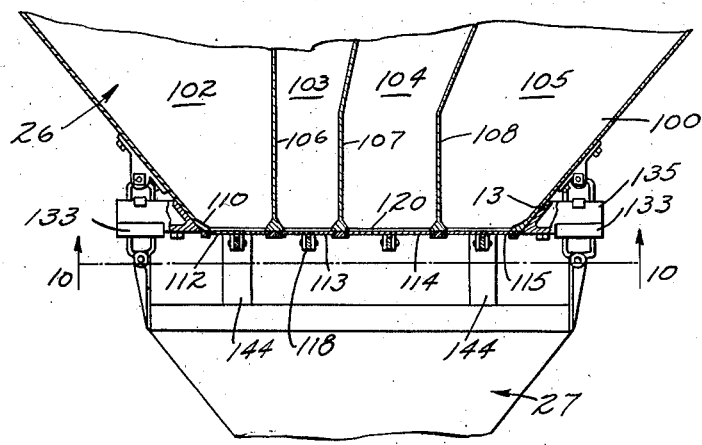
Fig. 12 is a vertical sectional view taken on the line 12—12 of Fig. 11.
Figure 10:
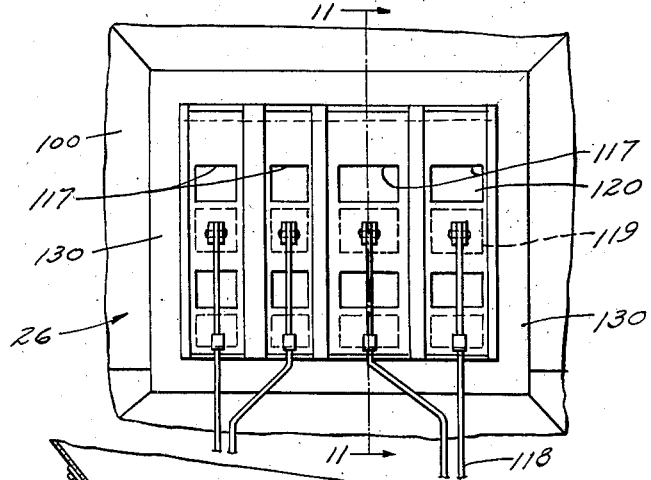
Fig. 10 is a bottom plan view of aggregate gates of my invention.
Figure 11:
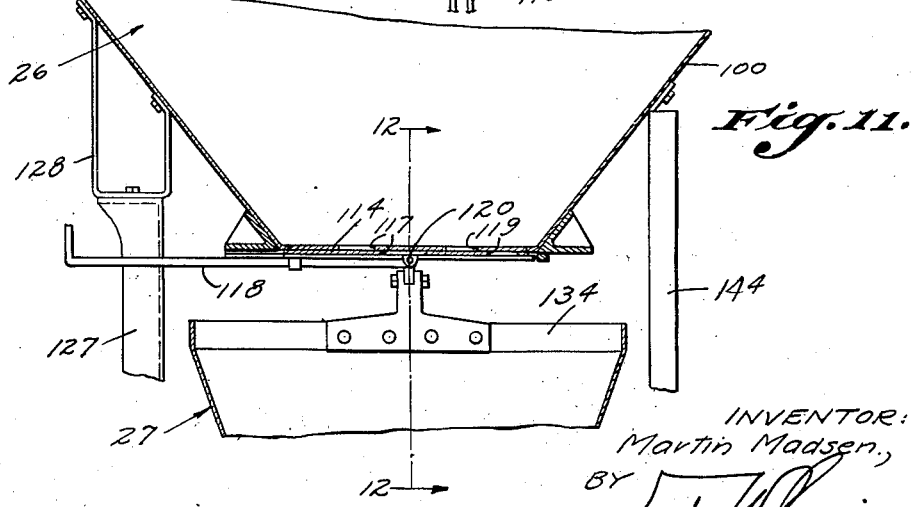
Fig. 11 is a longitudinal section taken on the line 11—11 of Fig. 10.

Referring specifically to the drawings, a portable asphalt mixing plant 20 is shown which embodies the features of my invention. For the purpose of making the detailed description easier to understand, the main elements of the plant 20 will be first briefly described as follows:

A wheel chassis 21 has a mixer 22 mounted thereon, the function of the mixer being to mix melted asphalt and quantities of rock aggregate delivered thereto, so that the mixture when discharged downward from the mixer will be suitable for use as a paving material.

Also mounted on the carriage 21 is an asphalt melting cabinet 23, the function of which is to melt asphalt, and a melted asphalt reservoir 24 for receiving asphalt melted in the cabinet 23, and a melted asphalt dispenser 25, the function of which is to receive melted asphalt from the reservoir 24 and dispense this in measured quantities into the mixer 22.

Also mounted on the wheel chassis 21 is an aggregate container 26 adapted to contain aggregate, and having a weighing mechanism 27, adapted to dispense aggregate in measured quantities from the container 26 into the mixer 22.

Also mounted on the chassis 21 above the container 26 is a drier and screening mechanism 30, the function of which is to dry rock aggregate delivery thereto, and, dividing this into various sizes, deliver these sizes separately to certain compartments in the container 26.

Also provided on the chassis 21 is an aggregate elevator mechanism 32, the function of which is to deliver aggregate to the drier and screening mechanism 30. For the purpose of driving the mixer 22 and the aggregate elevator 32, a suitable source of motive power such as an internal combustion engine 33 is provided on the chassis 21.

For supplying heat to the asphalt melting cabinet 23 and for vaporizing the fuel burned in the drier and screening mechanism 30, a boiler 35 is mounted on the chassis 21. For providing a supply of water for the boiler 35, a water reservoir tank 36 is mounted adjacent thereto on the chassis 21. Fuel to supply the boiler 35 and the drier and screening mechanism 30 is contained in a fuel tank 38, also mounted on the chassis 21.

The chassis 21 may preferably include a horizontal frame 50 including side channel members 51 and transverse channel members 52 and 53. The frame 51 is mounted on a rear wheel assembly 54 and a front wheel assembly 55. The wheel assemblies 54 and 55 are of the same character as front and rear wheel assemblies on which standard automobile truck trailer frames are mounted so that no detailed description of these assemblies is necessary. As may be seen in Fig. 3, the front wheel assembly 55 is provided with a tongue 56 by which the mixing plant 20 may be towed in the same manner as a standard trailer.

Provided on the outer faces of the members 51, opposite from the front and rear wheel assemblies 54 and 55, are jacks 58 which are adapted to bear against the axle of the front wheel assembly 55, so as to rigidly support the front end of the frame 50 on the axles of both wheel assemblies. By manipulation of the jacks 58 the frame 59 may be tilted a slight amount so as to bring this frame as nearly as possible into a horizontal position for a purpose to be described later.

Extending upward from the side members 51 of the frame 50 are a plurality of uprights 60, on the upper ends of which is mounted a horizontal frame 61. Suitable bracing is provided to maintain the uprights 60 and the overhead frame 61 in rigidly fixed position relative to the chassis frame 50.

The mixer 23 includes a bowl 65, which is mounted upon the frame 50 and which has a bottom opening 66 controlled by a door 67, which is operated by a lever 68 pivotally mounted on the frame 50. Mixing paddles 69 are mounted on suitable shafts extending through the bowl 65 and are adapted to be rotated through suitable gear mechanism 70 by the engine 33.

For a detailed description of the mixer 22, reference is had to United States Letters Patent No. 1,662,120, issued March 13, 1928.

Extending upward from the bowl 65 is a substantially cylindrical housing 75 which is provided with a melted asphalt inlet duct 76. The asphalt melting cabinet 23 is mounted upon a platform 77 which extends outward from the right-hand side of the frame 61 and toward the rear thereof. The cabinet 23 comprises a retort-like vessel 80 having a cover 81 provided at its upper end and fitted internally with a coil of steam pipe 82 which is supplied with steam from the boiler 35 by a pipe 84. Suitably mounted on the frame 61 at the rear right-hand corner thereof, adjacent the cabinet 23, is a crane 86 adapted to support suitable block and tackle by which a barrel of asphalt 87 may be raised from the ground, and with the lid 81 opened, be lowered into the cabinet 23.

Provided in the lower end of the vessel 80 is a melted asphalt drain 89 which opens at its lower end into a suitable opening in the upper end of the melted asphalt reservoir 24. The asphalt reservoir 24 is supported in any suitable manner in the framework of the chassis 21, and preferably in the position shown in Figs. 1 and 4. Leading from the reservoir 24 to the dispenser 25 is a pipe 93 having a valve 94.

The dispenser 25 is disposed directly above the upper open end of the melted asphalt duct 76, and includes a weighing bucket 95 over which the lower end of the pipe 93 extends. The bucket 95 is provided with a suitable manually operable valve 96 and is suspended from a weighing mechanism 97 which is supported upon the frame 61.

The aggregate container 26 is mounted upon the frame 61 directly over the mixer 22 so as to extend a certain distance downward into the housing 75. The container 26 includes a frusto-conical shell 100 having side doors 101 and divided into a plurality of compartments 102, 103, 104 and 105, by transverse partitions 106, 107 and 108. The compartments 102, 103, 104 and 105 are provided to contain aggregate of different sizes. Mounted in suitable slideways 110 in openings at the lower ends of the compartments 102, 103, 104 and 105, are aggregate gates 112, 113, 114 and 115. These gates have holes 117 which, when the gates are operated by operating rods 118, are brought into registry with corresponding holes 119 provided in floor plates 120 of the respective compartments opposite which the gates 112, 113, 114 and 115 are slidably mounted. Thus, when any of the gates 112, 113, 114 and 115 are moved by their respective rods 118, so as to bring the openings 117 and 119 of that compartment into registry, the aggregate from that compartment will flow downward into the weighing mechanism 27.

The weighing mechanism 27 includes a suitable scales 125 held down by a hook 126 on a frame 127 which encircles the scales 125, and is mounted on a bracket 128 which is rigidly secured to the outer surface of the aggregate container shell 100.

Rigidly secured to the lower end of the housing 100 is a ring casting 130 for supporting the weighing mechanism 27. The casting 130 has knife edges 131 suitably mounted on the opposite sides thereof, these knife edges being engaged by scales lever arms 132 and forming a fulcrum for these arms. The inner ends of the scales arms 132 are depressed by knife edges 133 upon which is suspended the scales weighing bucket 134. The outer ends of the arms 132 are connected by a pipe 135 which is provided centrally with a finger 136, which extends into and lifts up on the scales 125 so as to register the weight of material disposed in the bucket 134. The lower end of the bucket 134 is provided with a gate 140 which is adapted to be swung between open and closed positions by a handle mechanism 141, pivotally mounted on and carried by the bucket 134. For the purpose of steadying the bucket 134, steadying rods 142 may be loosely connected with the bucket 134 and to frame members 144 which extend between the shell 100 and the lower portion of the shell 75. It is intended that the portable mixing plant 20 be placed upon as level a base as possible before commencing operations, this being for the purpose of making the scale mechanisms 97 and 125 register accurately. The jacks 58, previously mentioned, are for the purpose of making a final adjustment of the position of the frame 50 so as to support the working elements of the plant 20 in as nearly a horizontal position as possible.

The drier and screening mechanism 30 includes a drier tube 150 which in the present embodiment is preferably imperforate. The tube 150 is inclined downward slightly toward the front; the front end thereof is open, and the rear or higher end has a short inturned annular flange 151. Extending across the frame 61, and supported thereby, is an I-beam 153 that supports a bearing 154, in which journals a shaft 155 having a gear 156 rigidly mounted on its outer end. The inner end of the shaft 155 extends through spiders 157 and 158 disposed within the tube 150 so that the rear upper end of this tube is rotatably mounted on the shaft 155.

Secured to the inner face of the tube 150, and extending between spiders 157 and 158, are helical blades 160. That portion of the shaft 155 which extends into the tube 150 is surrounded by heat insulating material 162.

Fixed to the inner surface of the tube 150 and extending forward from the spider 157 is a plurality of channel-iron aggregate agitating members 165, for a purpose to be described later. Provided in the forward lower end of the tube 150 are spiders 170 and 171 which receive the inner end of a furnace tube 172. The furnace tube is lined with a suitable refractory material 173, and is provided at its outer end with a bearing ring 174 which rotatably rests upon a pair of spaced rollers 175 so as to rotatably support the forward lower end of the tube 150. Horizontally mounted on the frame 61, just outside of the outer end of the furnace tube 172, is a cylindrical flame shield 177 and an oil burner 178 in a position to discharge a jet of burning fuel inward through the shield 177 and into the furnace tube 172.

Concentrically mounted upon the tube 172, and extending outward therefrom, is a disc 180, having a pair of annular flanges 181 and 182 extending rearward therefrom. Mounted on the tube 150 so as to extend outward therefrom is a compound spider 184 having an annular band 185 of a diameter in excess of the flange 181 and a narrow band 186 with a diameter in excess of the flange 182. Disposed between, and rigidly mounted upon the flange 181 and the band 185, is a frusto-conical screen 187. Extending around the screen 187, and spaced a slight distance therefrom, is a screen 188 of slightly larger diameter and mounted upon the flange 182 and the spider band 186. Also mounted on the tube 150 is a narrow spider 189, having a band 190 of slightly larger diameter than the wide band 185 of the spider 184. Extending between and mounted upon the bands 185 and 190 is a frusto-conical screen 191. As clearly shown in Fig. 6, the upper portion of the partition 106 is formed so as to lie close to the outer band 186 of the spider 184. The upper end of the partition 107 lies close to the forward edge of the wide band 185 of the spider 184. The upper end of the partition 108 extends close to the rear edge of the band 190 of the spider 189.

The drier and screening mechanism 30 is surrounded by a housing 200 which is preferably provided, at least in the upper portions thereof, with a lining 201 of heat insulating material such as asbestos or the like. The housing 200 makes a tight fit with the upper end of the aggregate container 26, so as to prevent any loss of heat by currents of air passing in and out of the housing 200. The front end of the housing 200 comprises a vertical plate 203, which surrounds and makes a fairly snug sliding fit with the rotatable furnace tube 172. At its rear end, the housing 200 is provided with a stack 204 for the discharge of products of combustion passing through the tube 150 and out of its upper end.

The housing 200 has a rear wall 205, which is provided with an intake hopper 206 having a chute 207 which extends downward at a sharp angle into the upper end of the tube 150.

Rotatably mounted in suitable bearings 220 and 221, which are rigidly mounted on a frame 222 extending upward from the frame 61, is a drive shaft 224 of the aggregate elevator 32. This shaft is provided, between the bearings 220 and 221, with an upper elevator wheel member 225 which in the present embodiment is a pulley. On the rear end of the shaft 224 is a non-rotatably mounted sprocket 226 pivotally mounted on the frame 61 and extending downward from one side of the frame 61 below the shaft 224 are tubular stretcher members 230. Slidably extending upward into the stretcher members 230 are members 231, provided at their lower ends with bearings 232, which rotatably receive a shaft 233, upon which is mounted a lower wheel member in the form of a suitable belt pulley 235. This construction provides an extensible frame for supporting the lower pulley 235 of the elevator 32.

Mounted on the bearings 232 is a ground dump bucket 236 into which aggregate is dumped to be elevated by the aggregate elevator 32. Passing around the wheel members 225 and 235 is an endless belt 237, having buckets 238, which, as the belt is rotated, are adapted to pick up aggregate from the dump bucket 236 and carry it upward, depositing it in the aggregate receiving hopper 206.

The members 231 are provided with collars 240 which are detachably fixed to the members 231, and when so fixed, are adapted to be engaged by jacks 242, provided on lower ends of the stretcher member 230, so as to force the members 231 downward and stretch the elevator belt 237. The members 231 also extend through guides 245 which are fixed to the lower frame 50 of the chassis 21 so as to steady the elevator 32 during its operation. When it is desired to stop the operation of the elevator 32, the collars 240 are loosened upon the members 231, and the bucket 236 is lifted upward, the members 231 sliding into the stretcher members 230 so that the bucket 236 may be tied in suspended position during transportation of the portable mixing plant 20.

Rotatably mounted on bearings 250 and 251, provided on the upper frame 61, is a shaft 252. Between these bearings the shaft 252 has a pinion gear 254 which meshes with the drive gear 156 of the drier and screening mechanism 30, so that when the shaft 252 is rotated, the tube 150 and the elements secured thereto are rotated.

Between the gear 254 and the bearing 251 are sprockets 256 and 257 non-rotatably mounted on the shaft 252. The sprocket 256 is in alignment with the drive sprocket 226 of the elevator 32, and these sprockets are connected by a suitable sprocket chain 258.

The engine 33 has a shaft 260, the outer end of which is mounted on a bearing 261 provided on the end member 53 of the frame 50. The shaft 260 is provided with a sprocket 262 which is in alignment with the sprocket 257 and is connected thereto by a suitable sprocket chain 263. The shaft 260 is connected by a suitable clutch mechanism with the engine 33 so that the rotation of the shaft 260 may be discontinued while the engine is still running. When the shaft 260 is rotated by the engine, the chain 263 rotates the sprocket 257, thereby rotating the shaft 252 and operating both the drier and screening mechanism 30 and the aggregate elevator 32.

Mounted on the outer end of the shaft 252 is a cathead 270, about which may be coiled the loose end of a rope of a block and tackle used in conjunction with the crane 86, for lifting a barrel of asphalt into the melting cabinet 23.

The operation of my invention is as follows:

A suitable pressure of steam is maintained in the boiler 35. A barrel of asphalt 87 is now placed in the cabinet 23, and steam is passed from the boiler 35 through the steam coils 82 of the cabinet 23, so as to melt the asphalt from the barrel 87 to cause this to run downward from the barrel 87 into the melted asphalt reservoir 24. The melted asphalt in the reservoir 24 is maintained in melted condition by heat radiating from suitable steam coils disposed therein, and supplied with steam from the boiler 35.

As soon as all the asphalt has been melted from the barrel 87, the lid 81 of the cabinet 83 is opened, the empty barrel removed and a fresh barrel of asphalt lifted on the crane 86, in the manner described above, and lowered into the cabinet 23. In this manner a quantity of melted asphalt is accumulated in the reservoir 24 so as to be available for use in the mixer 22 at any time.

Steam from the boiler 35 and fuel from the tank 38 are now supplied to the burner 178 so that the burner injects a blast of flame 275 into the furnace tube 172, as shown in Fig. 6. The products of combustion from this blast pass upward through the tube 150 and are exhausted from the stack 204 into the atmosphere. The tube 150 and connected parts are thus heated to a fairly high temperature.

The engine 33 is now started so that the shaft 260 is rotated, this causing the tube 150 and connected parts to be rotated, and also causing the aggregate elevator 32 to be set in operation.

Aggregate is now thrown into the bucket 236 by the use of shovels or wheelbarrows so that the elevator buckets 238 of the endless belt 237 carry the aggregate from the bucket 236 upward, and throw this into the receiving hopper 206, from which the aggregate slides downward through the chute 207 into the upper end of the drier tube 150. The aggregate thus discharged into the upper end of the tube 150 is caught by the helical blades 160 and moved downward into the portion of the tube 150 provided with the channel-iron blades 165. The aggregate is there engaged by the blades 165 and raised and poured from the upper surface of the rising blades 165 through the flame 275.

Owing to the inclination of the tube 150, the rotation of this tube results in the aggregate carried thereby flowing downward toward the lower or forward end of this tube. The continual elevating of the aggregate upon the blades 165 and the pouring of the aggregate through the flame 275 heat the aggregate to a high temperature and drive off all the moisture therefrom.

At the lower end of the tube 150 the aggregate passes through the spiders 170 and 171, between the furnace tube 172 and the drier tube 150, and enters the left-hand end of the inner screen 187. Owing to the size and shape of the screens 187 and 191, these form a single frusto-conical figure, the lower surface element of which inclines upward toward the left. Thus, any of the aggregate which will not go through either of these screens flows to the right and is discharged from the right-hand end of the screen 191 into the aggregate container compartment 105.

The aggregate thus discharged is the largest size of the aggregate utilized. Of the three screens 187, 188 and 191, the screen 191 is the coarsest, the screen 187 is of medium mesh, and the screen 188 is the finest. These screens are adapted to divide the aggregate into four grades, which for convenience will be referred to as first, second, third and fourth grades of aggregate in order of increasing size. As already described, the fourth or largest grade of aggregate passes over the screens 187 and 191 and is discharged into the compartment 105. The third grade passses over the screen 187 but falls through the screen 191 into the compartment 104. The second grade passes through the screen 187 but rides over the screen 188 so as to be discharged into the compartment 103. The first grade passes through the screen 187 and through the screen 188 into the compartment 102. With the continued operation of the drier and screening mechanism 30, a reserve supply of the four grades of aggregate is accumulated in the compartments 102, 103, 104 and 105.

That portion of the operation described above may be taking place while the portable mixing plant 20 is being towed to the place where quantities of hot, freshly mixed paving material are required for the purpose of laying or repairing a pavement. For the remainder of the operation, however, it is desirable that the plant 20 be halted so that the frame 50 is disposed in a position as nearly horizontal as possible to permit the weighing mechanisms 27 and 97 to operate with a reasonable degree of accuracy.

With the frame properly positioned, the gates 112, 113, 114 and 115 may be separately operated, by manipulating the rods 118, so as to cause a discharge of a suitable amount of aggregate from each of the compartments 102, 103, 104 and 105 into the weighing hopper 134. The amounts of each grade of aggregate thus discharged into the hopper 134 are indicated on the face of the scales 125, permitting proper control by the operator of these amounts. The hopper 134 is preferably designed to hold sufficient aggregate for an entire batch of asphalt. Owing to the fact that the weighing mechanism 27 is disposed practically entirely within the housing 75, and the fact that the aggregate container 26 is connected directly to the drier and screening mechanism 30, the aggregate thus delivered to the weighing mechanism 27 is heated to a much higher temperature than if a "hot" elevator conducted the aggregate from the drier to the aggregate container.

The operator now manipulates the valve 94 so that a desired quantity of melted asphalt flows from the pipe 93 into the asphalt weighing bucket 95. The transmission 70, between the engine 33 and the mixer 22, is then connected so that the paddles 69 of the mixer 22 are rotated in opposite directions by the engine 33. Now, the valve 96 is opened so that the melted asphalt in the bucket 95 flows downward through the duct 76 into the mixer bowl 65. At the same time the weighing hopper gate 140 is swung to one side by means of the lever 141 so that the aggregate in the hopper 134 passes downward into the mixer bowl 65.

The revolving paddles 69 thoroughly mix the aggregate and the melted asphalt. When this mixing has been completed, the lever 68 is operated so as to draw the mixer bottom gate 67 to one side to permit the discharge downward of the batch of paving material which has been prepared in the mixer 22. Any suitable platform may be provided underneath the mixer 22 for receiving the batches of paving material as they are dumped downward from the mixer.

It is thus seen that I have produced a very simple portable paving material mixing plant which may be operated very economically, and which will produce a relatively high grade of paving material owing to the fact that the aggregate is entirely protected from heat losses in traveling from the drier to the mixer. It is also noted in Fig. 1 that the scales 97 and 125 are both visible from the single position and by the provision of suitable control rods for actuating the valves 94 and 96 from the side of the plant nearest the observer in Fig. 1, a single expert operator can operate the plant 20 assisted only by inexperienced day laborers whose function will be to elevate full asphalt barrels into the cabinet 23, to remove empty barrels from this cabinet, and to shovel aggregate into the ground bucket 236.

I claim as my invention:

1. In means for preparing bituminous paving mixtures, in a portable system eliminating the use of "hot elevators" comprising in combination, an elevated aggregate drying means; separating means associated therewith for separating the aggregate according to size; storage means positioned below the drier and separating means, into which the aggregate is streamed by gravity and stored according to size; a mixer positioned below the aggregate container for receiving, by gravity, streams of heated aggregate from the storage means; and means for controlling the flow of aggregate from the storage means to the mixer, said system being constructed and arranged to prevent substantial heat losses during the gravitational downward movement of the aggregate from the elevated drying means.

2. In means for preparing bituminous paving mixtures, in a portable system eliminating "hot elevators" comprising in combination: a unitary aggregate drying and separating mechanism for heating and separating the aggregate according to size; storage means having a plurality of compartments for receiving the different sizes of separated aggregate; said storage means being positioned below the drying and separating means for receiving, by gravity, the separated heated aggregate; a mixer positioned below the storage means for receiving, by gravity, streams of heated aggregate from the storage means; means for regulating the flow of aggregate from the storage means to the mixer; said drying, separating, storage, and mixing means being constructed and arranged to prevent substantial heat losses during the downward gravitational movement of the heated aggregate from the elevated drying and separated means.

3. In means for preparing bituminous paving mixtures, in a portable system eliminating the use of "hot elevators" comprising, in combination: an elevated aggregate drying means with means associated therewith for separating the aggregate according to size; a storage means positioned below the drier into which the aggregate is streamed from the drier, by gravity, a mixer positioned below the storage means for receiving, by gravity, streams of heated aggregate from the storage means; and means for controlling the flow of the aggregate into the mixer; said system aforesaid being substantially entirely enclosed whereby to prevent substantial heat losses during the downward flowing movement of the aggregate from the drier to the mixing means.

4. In means for preparing bituminous paving mixtures, in a system eliminating the use of "hot elevators" comprising in combination: an elevated unitary rotary drying and screening mechanism for heating and separating aggregate; an aggregate storage means positioned below the unitary rotary drying and screening mechanism and adapted to receive, by gravity, streams of heated aggregate; a mixer positioned below the aggregate storage means for receiving, by gravity, streams of the heated aggregate from the storage means; means for controlling the flow of aggregate thereto; said system substantially enclosing the moving materials throughout their gravitational descent from the elevated drying and screening mechanism to the mixer, whereby to prevent substantial heat losses during the downward movement of the aggregate.

5. In means for preparing bituminous paving mixtures in a system eliminating the use of "hot elevators" comprising in combination: an elevated unitary drying and separating mechanism for heating and separating aggregate according to size; an aggregate storage means positioned below the unitary rotary drying and separating mechanism and adapted to receive, by gravity, streams of the heated aggregate; a mixer positioned below the aggregate storage means for receiving, by gravity, streams of the heated aggregate from the storage means; means for controlling the streaming of the heated aggregate to the mixer; said system substantially enclosing the moving materials throughout their gravitational descent from the elevated drying and separating mechanism to the mixer, whereby to prevent substantial heat losses during the downward movement of the aggregate.

6. In means for preparing bituminous paving mixtures, in a system eliminating the use of "hot elevators" comprising in combination: an elevated melting cabinet with means for supplying heat thereto; said melting cabinet being adapted to receive a barrel of asphalt therein to heat liquefy the same; a melted asphalt storage means positioned below the melting cabinet for receiving, by gravity, regulated quantities of the melted asphalt; a mixer below the asphalt storage means for receiving, by gravity, the melted asphalt therein; elevated aggregate drying means; storage means positioned therebelow for receiving the heated aggregate, by gravity, and means for supplying regulated quantities of the dried aggregate to the mixer in its heated condition; the downward gravitational descent of the asphalt and the aggregate, to the mixer, being substantially completely enclosed, whereby to prevent substantial heat losses and solidification of the asphalt.

7. In means for preparing bituminous paving mixtures, in a system eliminating the use of "hot elevators" comprising in combination: an elevated aggregate drying means, including heat producing means and a rotatable drum; screening means into which the heated aggregate passes, by gravity; storage means below said screening means into which the aggregate flows, by gravity; mixing means positioned below the storage means for receiving, in regulated quantities, the heated aggregate from the storage means; and weighing means adapted to receive the aggregate from the storage means, and deliver the same into the mixing means.

8. In means for preparing bituminous paving mixtures, in a system eliminating the use of "hot elevators" comprising in combination: an elevated aggregate drying means; storage means positioned below the drying means for receiving, by gravity, the heated aggregate; weighing means positioned below the storage means; mixing means positioned below the weighing means; means for controlling the downward flow of the heated aggregate from the storage means to the weighing means; and means for substantially enclosing the moving materials during their downward gravitational descent from the elevated drying means to the mixing means.

9. In means for preparing bituminous paving mixtures in a system eliminating the use of "hot elevators" comprising, in combination: an elevated aggregate drying means; storage means positioned below the same to receive, by gravity, the heated aggregate, and store the same until it is desired to be used; weighing means positioned below the storage means; means for regulating the discharge of the heated aggregate from the storage means to the weighting means; mixing means positioned below the weighing means; means enclosing the gravitational paths of movement of the aggregate from the storage means to the mixing means, whereby to prevent heat losses.

10. In means for preparing bituminous paving mixtures, in a system eliminating the use of "hot elevators" comprising in combination: an aggregate drying means, including heat producing means, and a rotatable drum; screening means into which said aggregate passes, by gravity; storage means below said screening means into which said aggregate passes, by gravity, mixing means into which said aggregate is introduced positioned below the storage means; and weighing means positioned between the storage means, and the mixing means adapted to receive said aggregate from the storage means, in regulated quantities, and deliver the same into said mixing means.

11. In means for preparing bituminous paving mixtures, in a system eliminating the use of "hot elevators" comprising in combination: an elevated drying means, and separating means; storage means below the separating means into which heated aggregate passes, by gravity; mixing means below the storage means for receiving, by gravity, the heated aggregate; an elevated asphalt melting cabinet; and means for permitting the melted asphalt to flow, by gravity, through the melting cabinet to the mixer, in regulated quantities; the paths of movement of the heated aggregate and the heated asphalt, from the elevated melting cabinet, and aggregate drying means, respectively, being substantially closed, whereby the downward gravitational descent of these materials to the mixer is accomplished without substantial heat losses.

12. The art of preparing bituminous paving mixtures, eliminating the use of "hot elevators", the improvement which comprises: the steps of elevating unheated and substantially non-liquid asphalt to an elevated heating zone, and there supplying heat to the asphalt to liquefy the same; streaming, by gravity, the thus liquefied asphalt to a storage zone; streaming, by gravity, the asphalt from the storage zone to a mixing zone positioned therebelow; introducing aggregate to an elevated aggregate heating zone; streaming the aggregate from said zone to a receiving zone positioned therebelow; and thence streaming the regulated quantities of the heated aggregate from the receiving zone to the mixing zone, wherein it is intimately combined with the heat liquefied asphalt for the preparation of road building materials; and substantially enclosing the downward path of the aggregate and asphalt, respectively, whereby to prevent substantial heat losses prior to their introduction into and interadmixture in the mixing zone.

13. The art of preparing bituminous portable paving mixtures, in a system eliminating the use of "hot elevators" comprising: the steps of elevating quantities of unheated asphalt to an elevated heating zone, and there subjecting the same to heating action to liquefy the asphalt therein; streaming, by gravity, the thus liquefied asphalt to a storage zone positioned therebelow; removing the heated asphalt from the reservoir, by streaming it, in regulated quantities, by gravity, to a mixing zone therebelow; and weighing the heat liquefied asphalt before its discharge from the storage zone into the mixing zone; said system being substantially completely enclosed, whereby to prevent solidification of the asphalt; and introducing heated aggregate to the mixing zone for admixture with the heated asphalt therein.

14. The art of preparing bituminous paving mixtures, in a system eliminating the use of "hot elevators" comprising: the steps of introducing aggregate to an elevated heating zone, wherein the same is heated; separating according to sizes the heated aggregate immediately following the drying action thereof and storing the same into enclosed compartments below the heating zone; streaming by gravity selective quantities of the heated aggregate from the storage zone into a weighing means positioned therebelow; and thereafter discharging the weighed heated aggregate into a mixing zone positioned therebelow; the system aforesaid being substantially enclosed whereby to conserve against heat losses.

15. In a portable paving material mixing plant, the combination of: a wheeled chassis; a mixer mounted on said chassis; an aggregate container mounted on said chassis above and adapted to discharge directly into said mixer; an aggregate drying mechanism mounted on said chassis above and adapted to discharge directly into said container; and means for elevating aggregate to said drying mechanism, said aggregate elevating means including an upper wheel member rotatably mounted on said chassis, an extensible frame mounted on said chassis, a lower wheel member rotatably mounted on said frame, and an endless conveyor member passing around said wheel members, said frame, when extended, tensioning said conveyor member for use, and, when retracted, lifting said lower wheel member to permit said plant to be moved.

16. In a portable paving material mixing plant, the combination of: a wheeled chassis; a mixer mounted on said chassis; an aggregate container mounted on said chassis above and adapted to discharge directly into said mixer; an aggregate drying mechanism mounted on said chassis above and adapted to discharge directly into said container; and means for elevating aggregate to said drying mechanism, said aggregate elevating means including an upper wheel member rotatably mounted on said chassis, an extensible frame mounted on said chassis, a lower wheel member rotatably mounted on said frame, an aggregate receiving bucket mounted on said frame, and adapted to rest on the ground when said frame is extended, and an endless conveyor member passing around said wheel members, said frame, when extended, tensioning said conveyor member for use, and, when retracted, lifting said lower wheel member and said receiving bucket to permit said plant to be moved.

In testimony whereof, I have hereunto set my hand at Los Angeles, California, this 23rd day of April, 1928.

MARTIN MADSEN.